3,426,779
PRESSURE ACTUATED RELIEF VALVE
Robert C. Corbin, Pittsburgh, Pa., assignor to Kerotest Manufacturing Corp., Pittsburgh, Pa., a corporation of Pennsylvania
Filed Feb. 8, 1967, Ser. No. 614,653
U.S. Cl. 137—68    8 Claims
Int. Cl. F16k *17/40, 13/04*

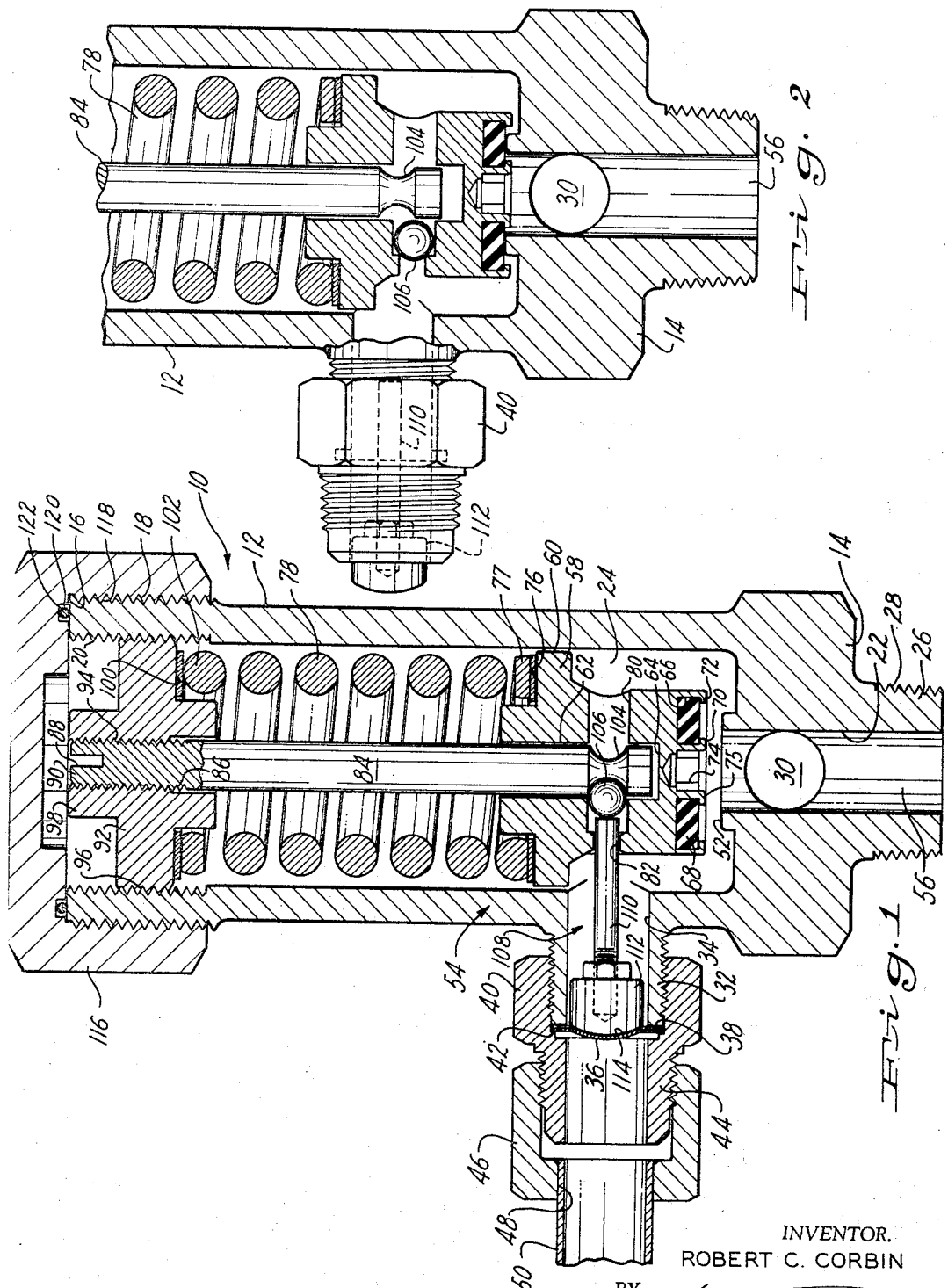

ABSTRACT OF THE DISCLOSURE

Apparatus for venting a container above a predetermined pressure by rupturing a frangible disc and thereafter sealing the container at a lower pressure to retain at least a portion of the material in the container at the lower pressure. A valve member is positioned in a passageway between inlet and outlet ports of a valve housing. The valve is maintained in an open position against the urging force of a spring by a latching means. The latching means is controlled by the frangible disc so that it is disengaged upon rupture of the frangible disc. The passageway between the inlet and outlet ports of the valve housing remains open so that the frangible disc is subjected to substantially the same pressure as that in the container.

BACKGROUND OF THE INVENTION

Field of the invention

This invention relates to a pressure actuated relief valve and more particularly to a pressure actuated relief valve having a primary frangible disc-type safety valve and a pressure responsive secondary valve operable to close only after the frangible disc has ruptured.

Description of the prior art

On containers, especially containers subject to a rapid increase in pressure, a fail-safe type pressure relief valve, such as a frangible disc rupturable above a predetermined pressure, is essential to prevent the container from rupturing due to a rapid build up or increase in pressure within the container. The frangible disc type relief valve opens an outlet port to the atmosphere and the material within the container escapes through the outlet port formerly maintained closed by the frangible disc until the pressure within the container is equal to atmospheric pressure.

Attempts have been made in the past to provide a secondary valve within the valve housing or container that was operable to close the outlet port at a second predetermined pressure below the pressure at which the frangible disc ruptures. With this secondary valve, the outlet port is closed at this reduced pressure and at least a portion of the material is retained within the container. The amount of material retained in the container is dependent on the pressure setting of the secondary pressure responsive valve. Examples of valves that include both a frangible disc type relief valve and a pressure relief valve operable at a pressure below the rupturing pressure of the frangible disc are illustrated in Carssow 966,999 and Smith 2,047,750. Other examples of rupturable disc relief valves are illustrated in the patents to McBride 2,226,732 and Greenwood 2,888,025 and Summers 2,960,096.

In all of the above patents, the spring biased pressure relief valve is connected in series with the rupturable disc valve and remains closed below a preselected pressure. The sequence of operation of the valves illustrated in the prior art requires the spring loaded pressure responsive valve to first open the passageway connecting the container with the frangible disc type valve before the frangible disc is subjected to the increased fluid pressure. The valves, as described in the prior art are subject to malfunctions and do not comply with safety regulations that require the passageway between the containers and the frangible disc to remain open at all times so that the frangible disc is always subjected to the pressure within the container. Between the container and the frangible disc the prior art valve devices position a pressure responsive valve. This structure is objectionable because the spring actuated pressure relief valve may become inoperable due to corrosion, jamming or the like and freeze in the closed position if the material in the container and the components of the valve are not compatible or pressure may be trapped between frangible disc and pressure relief valve causing back pressure. To open the defective pressure relief valve may require a pressure substantially greater than the bursting pressure of the container. It is apparent the prior art valves are not safety valves in the sense that a malfunction may occur in the valve and destroy its safety features.

Attempts have been made, as for example, in the patent to Smith 2,047,750 (FIGURE 3) is continuously subject the frangible disc to the pressure of the material in the container. A bypass passageway is provided in the housing of Smith between the container and the frangible disc. This arrangement, however, does not solve the problem of retaining the material within the container at a pressure below the pressure at which the frangible disc ruptures. Once the frangible disc in Smith ruptures, the container is vented to the atmosphere through the bypass passageway which results in the material escaping from the container until the pressure within the container reaches atmospheric pressure. Further in Smith the bypass passageway may clog or freeze due to the velocity of the material escaping therethrough. There is a need, therefore, for a pressure actuated relief valve that has the desirable properties of a fail-safe type frangible disc type valve wherein the frangible disc is continuously subjected to the pressure within the container and a secondary pressure responsive valve that remains open until the frangible disc is ruptured and then closes the outlet port after sufficient material has escaped through the outlet port to reduce the pressure within the container to a safe predetermined pressure.

SUMMARY OF THE INVENTION

Briefly, the invention comprises a pressure actuated relief valve that has a housing with a passageway connecting an inlet and outlet port. A frangible disc is arranged to seal the outlet port and is rupturable above a preselected pressure. Positioned within the valve housing is a valve member operable to close the passageway between the inlet port and the outlet port at a pressure below the pressure at which the disc ruptures. A latching means maintains the pressure responsive valve in an open position and is controlled by the frangible disc so that the latching means is disengaged upon rupture of the frangible disc.

Accordingly, the principal object of this invention is to provide a pressure actuated relief valve that includes a frangible disc continuously subjected to a pressure within the container and a secondary pressure responsive valve that is arranged to close after the frangible disc ruptures.

Another object of this invention is to provide a latching means for maintaining a pressure actuated valve in an open position until the frangible disc is ruptured.

These and other objects and advantages of this invention will be more completely disclosed and described in the following specification, the accompanying drawings and the appended claims.

BRIEF DESCRIPTION OF THE DRAWINGS

In the drawings:

FIGURE 1 is a view mainly in vertical section showing the preferred form of the valve constructed in accordance with the invention with the secondary pressure responsive valve in an open latched position.

FIGURE 2 is a fragmentary view similar to FIGURE 1 illustrating the latch mechanism disengaged and the secondary pressure responsive valve in a closed position.

DESCRIPTION OF THE PREFERRED EMBODIMENTS

Referring to the drawings there is illustrated a pressure actuated relief valve generally designated by the numeral 10 that has a cylindrical cup shaped housing 12 with a bottom wall 14 and an annular upper edge portion 16. The housing 12 has an externally threaded portion 18 and an internally threaded portion 20. The bottom wall 14 has a central passageway 22 therethrough opening into the chamber 24 within the housing 12 and an annular protuberance or nipple 26 extending downwardly therefrom with an externally threaded portion 28. The nipple 26 connects the valve housing 12 to a container not shown. The passageway 22 extends through the bottom wall 14 and nipple 26 so that the pressure in chamber 24 is the same as the pressure in the container. A horizontally extending port 30 with suitable valve means may be positioned in the bottom wall 14 and used as a means for charging and discharging the container connected to the valve 10.

The housing wall 12 has a laterally extending externally threaded protuberance or nipple 32 formed preferably integrally therewith. The nipple 32 has an internal channel or passageway 34 that communicates with the valve housing chamber 24 and forms an outlet port for the chamber 24. A frangible disc 36 abuts the front annular edge 38 of nipple 32 and is maintained in position by means of a nut 40 threadably secured to the nipple 32 and having an inwardly extending annular shoulder portion 42 that abuts the peripheral edge of the frangible disc 36.

The nut 40 has an externally threaded nipple portion 44 on which a nut 46 is secured. The nut 46 has a passageway 48 therethrough which may be connected by means of a cylindrical member 50 as a suitable outlet conduit or vent means for the container.

There is an annular raised valve seat 52 formed on the inner surface of the housing lower wall 14 around the passageway 22. A valve assembly generally designated by the numeral 54 is arranged to abut the valve seat 52 and close the channel or passageway 22 to prevent the flow of material through passageway 22 into chamber 24 below a predetermined pressure in the container. For convenience the inlet passageway 22 and outlet passageway 34 will also be referred to as inlet port 22 and outlet port 34 for chamber 24.

The valve assembly generally designated by the numeral 54 has a valve seat holder 58 with a cylindrical external wall 60 that has a diameter slightly smaller than the inner diameter of the cylindrical chamber 24. The wall 60 on valve seat holder 58 thus serves as a guide for the axial movement of the valve assembly 54 within the chamber 24. The valve seat holder 58 has an axial bore 62 extending downwardly from the upper surface and terminating at 64 within the valve seat holder 58. The bottom wall of the valve seat holder 58 has an annular recessed portion 66 in which there is positioned a flexible deformable valve seat 68 that is arranged to abut the annular raised valve seat 52 on botom wall 14 to close the inlet port 22 as is illustrated in FIGURE 2. The valve seat holder 58 has inturned annular flange members 70 and 72 that maintain the valve seat 68 in aligned position with the raised valve seat 52 and a hexagonally shaped recessed portion or receiver 74 in the valve seat holder bottom wall 75. The valve seat holder 58 has a shoulder portion 76 adjacent the upper edge against which the end 77 of spring 78 abuts.

The valve holder has a horizontal bore 80 therethrough that intersects the vertical bore 62 and has an end portion 82 of reduced diameter. A hanger rod 84 has an externally threaded upper portion 86 with a recessed portion 88 in the top wall 90. The hanger rod is adjustably secured in a hanger rod support 92 by the threaded end portion 86 of rod 84 being threadably engaged in the internally threaded bore 94 of hanger rod support 92. The hanger rod support 92 has an externally threaded portion 96 which is threadably secured to the inner wall of the valve housing 12 to permit vertical adjustment of the hanger rod support 92 within the chamber 24. An upper protuberance 98 on hanger rod support 92 may be of hexagonal or rectangular configuration for receiving a wrench or the like to rotate and adjust the hanger rod support 92 vertically within the chamber 24. The hanger rod support has a shoulder portion 100 against which the end 102 of spring 78 abuts.

The pressure at which the valve seat 68 will move away from the raised valve seat 52 is determined by the resisting or closing force exerted by the spring 78. In order to move the valve seat 68 away from the raised valve seat 52 the bottom wall 14 moves upwardly and compresses spring 78. By rotating the hanger rod support 92 within the housing 24 the spring 78 may be further compressed to require a greater pressure to open the valve member 54.

The rod 84 has a semicircular recessed portion or groove 104 adjacent its lower end. The groove 104 is arranged to receive a spherical ball 106 that has a diameter greater than the diameter of the semicircular groove 104.

A latching device generally designated by the numeral 108 has a rod member 110 that extends through the horizontal bore 82 in the valve seat holder 58 and abuts the spherical ball 106 in bore 80 and maintains the ball 106 in groove 104 as will be later explained. The other end of the rod 110 has an enlarged heat portion 112 with an end surface 114 that abuts the frangible disc 36. It should be noted the cross sectional area of the enlarged head portion 112 is less than the area of the frangible disc 36 so that the frangible disc inner surface is subjected to the pressure in passageway 34. The enlarged head portion 112 may be of any suitable configuration as long as the rear surface of the frangible disc is subjected to the pressure of the material in the container.

A cup shaped cap member 116 having an internally threaded portion 118 is threadably secured to the externally threaded portion 18 of the valve housing 12 to seal the valve assembly 54. The cup shaped cap member 116 has an annular recessed portion 120 in which there is positioned a O-ring 122 to provide a static seal between the cup shaped cap member 116 and the annular end wall 16 of valve housing 12.

The dimensions of ball member 106 and groove 104 in hanger rod 84 are such that the ball 106, when urged into groove 104 by rod member 110, will maintain the valve seat holder 58 in an open position. When the rod member 110 is moved away from ball 106, the ball moves laterally out of the groove 104 in the rod 84 to release the valve seat holder 58 for downward movement by spring 78 to set the deformable valve seat 68 of valve assembly 54 on the elevated valve seat 52. The vertical dimension of the groove 104 along the surface of rod 84 is less than the diameter of the ball 106 so that the rod member 110 must continually urge the ball 106 into groove 104 to maintain the valve seat holder 58 in open position.

OPERATION

The operation of valve 10 is as follows. Before installation in a container the valve assembly 54 is set to open when the valve seat 68 is subjected to a preselected pressure in passageway 22. Where it is desired to increase the pressure at which the valve assembly 54 will open, the hanger rod support 92 is adjusted within the chamber 24 and moved downwardly therein to further compress the spring 78. Conversely, when it is desired to reduce the pressure at which the valve assembly 54 is open, the hanger rod support 92 is moved upwardly in chamber 24 to reduce the compression of spring 78.

The ball 106 has preferably been positioned in bore 80 of valve seat holder 58 as is illustrated in FIGURE 2 while the pressure setting of valve assembly 54 is adjusted. After the valve assembly has been adjusted to open at a preselected pressure, as for example, between 2400 and 2700 pounds per square inch, the valve housing 12 is then secured to a jack device by threadably securing the nipple portion 26 to a jack that has a hexagonal rod extending upwardly through passageway 22 and into the hexagonal receiver 77 in the lower wall 75 of valve seat holder 58. The jack is actuated to move the valve seat holder 58 upwardly and compress the spring 78. The jack is also arranged to rotate the valve seat holder 58 to align the bore 80 with the outlet passageway 34. When the valve seat holder 58 has been moved upwardly to the position illustrated in FIGURE 1, the latching device rod member is inserted in the passageway 82 and moves the spherical ball 106 into the groove 104 in hanger rod 84. Where necessary the rod 84 can be adjusted longitudinally by rotation in hanger support 92 to align the groove 104 with bore 80 in the valve seat holder 58. The frangible disc 36 is then positioned, as illustrated in FIGURE 1, and the nut 40 is secured to the nipple portion 32 to maintain the frangible disc in position and the latching device 108 in latching relation with the ball 106 in the groove 104. In this latched position there is an open passageway between the inlet port 22 and the frangible disc 36 in outlet port 34 so that the frangible disc 36 is subjected to substantially the same pressure as the pressure in the container to which the valve member 10 is secured. For convenience, a portion of the chamber may also be designated as the passageway between the inlet port 22 and the outlet port 34. It should be understood, however, that the entire chamber 24 is open to the pressure of the container when the valve assembly 54 is open.

The latching device 108 is unlatched in the following manner. Assuming the pressure in the container exceeds the bursting pressure of the frangible disc 36, the disc 36 ruptures and the latching device 108 is propelled outwardly from the passageway 34. The movement of rod member 110 with enlarged head portion 112 releases the latching force formerly exerted on ball 106 and since less than half of ball 106 is within the groove 104, the ball moves outwardly in bore 80 and permits the valve seat holder 58 to move downwardly to the position illustrated in FIGURE 2. Since valve assembly 54 is preset for a preselected working pressure, which is below the pressure at which the disc 36 ruptures, the valve assembly 54 will remain open until the pressure within the container is reduced below the working pressure of the pressure responsive valve 54. Below this working pressure of valve 54 within the container, the flexible deformable valve seat 68 will seat on raised valve seat 52 and close the port 30 to thus retain the material within the container at this reduced working pressure. Should the pressure within the container exceed the working pressure of the valve assembly 54, the valve seat 68 moves away from valve seat 52 to vent the container to atmosphere until the pressure is again reduced to a pressure below the working pressure of the valve 54. The valve 10 may be reset by following the previously described procedure of compressing the spring with a jack device, inserting the latching device 108 and replacing the frangible disc 36.

The term material used in the specification and claims is intended to designate any type of material within the container that is capable of an increase in pressure and with which it is desirable to use safety relief devices. For example, the herein disclosed valve may be used with liquified or nonliquified flammable and nonflammable gases and pressurized liquids as defined by the Compressed Gas Association in Pamphlet S-1 on page 15. It is desirable to connect the valve to the container so that the frangible disc is in direct communication with the vapor space of the cylinder when in normal use so that the frangible disc is subjected to the vapor pressure.

The term pressure is used in the specification in a generic sense and is intended to designate the application of a force by the material in the container on the frangible disc. The frangible disc is in direct contact with the material in the container. The pressure may be designated as a fluid pressure in that the valve is operable when the frangible disc is subjected to either a vapor pressure or a liquid pressure.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. A pressure actuated relief valve comprising,
a valve housing forming a chamber and having an inlet and an outlet port, said chamber including a passageway connecting said inlet port and said outlet port,
said inlet port being adapted to be connected to an opening in a container so that pressure in said passageway is substantially the same as the pressure in the container,
a frangible disc sealing said outlet port and arranged to rupture above a first preselected pressure in said passageway to thereby open said outlet port,
a valve member positioned in said chamber and operable below a second preselected pressure to close said passageway between said inlet port and said outlet port to the flow of material therethrough, and to open said passageway above said second preselected pressure,
said second preselected pressure being less than said first preselected pressure, and
latching means associated with said frangible disc and operable to maintain said valve member in an open position while said frangible disc remains in sealing relation with said outlet port.

2. A pressure actuated relief valve as set forth in claim 1 in which,
a portion of said latching means abuts said frangible disc so that release of said latching means and the closing of said valve member is responsive to the rupturing of said frangible disc.

3. A pressure actuated relief valve as set forth in claim 1 in which,
said latching means includes a rod member having one end connected to said valve member and holding said valve member in an open position and another end portion in abutting relation with the inner surface of said frangible disc,
said rod member being operable upon the rupturing of said frangible disc to move away from said valve member and release said valve member so that said valve member closes said passageway at a pressure therein below said second predetermined pressure.

4. A pressure actuated relief valve as set forth in claim 1 in which,
said valve member includes a valve seat holder with a bore therein,
resilient means urging said valve seat holder in a direction perpendicular to said bore and toward said inlet port,
said latching means including a rod member having an end portion positioned in said bore and holding said valve seat holder in an open position against the force of said resilient means and another end portion in abutting relation with the inner surface of said frangible disc, said rod member being operable upon the rupturing of said frangible disc to move out of said bore in said valve seat holder and release said valve member so that said valve member closes said passageway at a pressure therein below said second predetermined pressure.

5. A pressure actuated relief valve as set forth in claim 1 in which, said valve member includes a hanger rod secured within said valve housing, said hanger rod having a recessed portion, a valve seat holder having a first bore therein, said hanger rod positioned in said first bore and movable longitudinally therein, said valve seat holder having a second bore therein intersecting said first bore, said latching means including a spherical ball positioned in said second bore and operable to seat in said hanger rod recessed portion and hold said valve seat holder in an open position, and means urging said spherical ball into said hanger rod recessed portion to hold said valve member open.

6. In a pressure responsive valve the combination comprising, a valve housing having a bottom wall and a side wall forming a valve chamber, an inlet port in said bottom wall opening into said chamber and an outlet port in said side wall spaced above said inlet port and opening into said chamber, said inlet port being adapted to be connected to an opening in a container so that the pressure in said chamber is substantially the same as the pressure in the container, a frangible disc sealing said outlet port and arranged to rupture above a first preselected pressure in said passageway and open said outlet port, a hanger rod positioned in said valve chamber, a valve member having a valve seat holder movable axially on said hanger rod, a valve seat on said valve seat holder operable to close said inlet port, resilient means urging said valve member toward a closed position against said inlet port, said resilient means operable to maintain said valve seat in a closed position below a second preselected pressure at said inlet port, said second preselected pressure being less than said first preselected pressure, and latching means operable to maintain said valve member in an open position against the force of said resilient means while said frangible disc remains in sealing relation with said outlet port.

7. A pressure responsive valve as set forth in claim 6 in which, said hanger rod member has a recessed portion at a location opposite said outlet port, said valve seat holder has a lateral passageway therein, said latching means includes a rod member extending into said passageway and holding said valve member in an open position against the force of said resilient means, said rod member maintained in said passageway by said frangible disc.

8. A pressure responsive valve as set forth in claim 7 which includes, a spherical ball member positioned in said lateral passageway and having a portion thereof extending into said hanger member recessed passageway, said rod member urging said ball member into said hanger rod recessed portion to latch said valve member in an open position.

References Cited

UNITED STATES PATENTS

| | | | |
|---|---|---|---|
| 2,226,732 | 12/1940 | McBride | 137—71 |
| 2,562,672 | 7/1951 | Kunert et al. | 137—71 |
| 2,960,096 | 11/1960 | Summers | 137—69 |

LEONARD D. CHRISTIAN, *Primary Examiner.*

U.S. Cl. X.R.

251—73